US011113490B2

(12) United States Patent
Spitz

(10) Patent No.: US 11,113,490 B2
(45) Date of Patent: Sep. 7, 2021

(54) SYSTEM AND METHOD FOR EVALUATING SYMBOLS

(71) Applicant: Cognex Corporation, Natick, MA (US)

(72) Inventor: Glenn Spitz, Boulder, CO (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 17/001,393

(22) Filed: Aug. 24, 2020

(65) Prior Publication Data

US 2021/0073495 A1    Mar. 11, 2021

Related U.S. Application Data

(63) Continuation of application No. 16/358,029, filed on Mar. 19, 2019, now Pat. No. 10,755,062.

(51) Int. Cl.
*G06K 7/10* (2006.01)
*G06K 7/14* (2006.01)
*G06T 7/90* (2017.01)

(52) U.S. Cl.
CPC ............ *G06K 7/1413* (2013.01); *G06T 7/90* (2017.01); *G06T 2207/10024* (2013.01); *G06T 2207/20081* (2013.01); *G06T 2207/30204* (2013.01)

(58) Field of Classification Search
CPC ............ G06K 7/1413; G06K 7/10851; G06K 7/10772; G06T 7/90
USPC .................................................. 235/462.01
See application file for complete search history.

(56) References Cited

U.S. PATENT DOCUMENTS

| 7,653,263 | B2 | 1/2010 | Wheeler et al. |
| 8,316,425 | B2 | 11/2012 | Cattrone et al. |
| 10,755,062 | B1* | 8/2020 | Spitz ................... G06T 7/90 |
| 2012/0039529 | A1* | 2/2012 | Rujan ............ G06K 19/06037 382/164 |
| 2014/0132429 | A1 | 5/2014 | Scoville |
| 2015/0213326 | A1 | 7/2015 | Utsumi |
| 2015/0243014 | A1* | 8/2015 | Bise ................. G06K 9/4652 382/110 |
| 2016/0014329 | A1 | 1/2016 | Okigawa |
| 2016/0028921 | A1 | 1/2016 | Thrasher et al. |
| 2016/0267305 | A1 | 9/2016 | Lei et al. |
| 2017/0223334 | A1* | 8/2017 | Nobayashi ......... H04N 13/254 |
| 2019/0306480 | A1 | 10/2019 | Talagala et al. |
| 2019/0394379 | A1 | 12/2019 | Segapelli et al. |

FOREIGN PATENT DOCUMENTS

EP    3495987 A1    6/2019

OTHER PUBLICATIONS

Chen et al., A Two-Stage Quality Measure for Mobile Phone Captured 2D Barcode Images, Pattern Recognition, 2013, 46:2588-2598.
Microscan Systems, Inc., Application of Data Matrix Verification Standards, Copyright 2009 Microscan Systems, Inc., 6 pages.
(Continued)

*Primary Examiner* — Ahshik Kim
(74) *Attorney, Agent, or Firm* — Quarles & Brady LLP

(57) ABSTRACT

Evaluating a symbol on an object can include acquiring a first image of the object, including the symbol. A second image can be derived from the first image based upon determining a saturation threshold for the second image and possibly scaling of pixel values to a reduced bit-depth for the second image.

20 Claims, 9 Drawing Sheets

(56) References Cited

OTHER PUBLICATIONS

Microscan Systems, Inc., Understanding 2D Verification, Comparing Evaluation Parameters for Data Matrix Symbol Verification, Copyright 2013 Microscan Systems, Inc., 4 pages.

Nachtrieb, DPM Barcode Verification—Barcode Test, http://barcode-test.com/dpm-barcode-verification/, 2016, 4 pages.

Xu et al., Identification and Recovery of the Blurred QR Code Image, In 2012 International Conference on Computer Science and Service System, IEEE, 2012, pp. 2257-2260.

ISO/IEC, TR 29158, Technical Report, Information Technology—Automatic Identification and Data Capture Techniques—Direct Part Mark (DPM) Quality Guideline, Copyright ISO/IEC 2011, 26 pages.

ISO/IEC, 15415, International Standard, Information Technology—Automatic Identification and Data Capture Techniques—Bar Code Symbol Print Quality Test Specification—Two-Dimensional Symbols, Copyright ISO/IEC 2011, 52 pages.

* cited by examiner

SYSTEM AND METHOD FOR EVALUATING SYMBOLS

CROSS-REFERENCE TO RELATED APPLICATIONS

This application claims priority to U.S. non-provisional application Ser. No. 16/358,029, titled System and Method for Evaluating Symbols and filed on Mar. 19, 2019, the entirety of which is incorporated herein by reference.

STATEMENT REGARDING FEDERALLY SPONSORED RESEARCH OR DEVELOPMENT

Not applicable.

FIELD OF THE INVENTION

The present invention relates to evaluating symbols, including for verification of barcodes.

BACKGROUND OF THE INVENTION

In many contexts, it may be useful to use imaging systems to evaluate symbols. For example, in direct part marking ("DPM") and other contexts, acquired images of barcodes can be analyzed in order to verify that the barcodes have been appropriately printed or marked, or for other reasons. In some cases, the symbols to be evaluated may be moving. For example, it may be useful to verify DPM barcodes as objects on which the barcodes are marked are moving along a production line or other conveyance.

SUMMARY OF THE INVENTION

Some embodiments of the invention provide a system for evaluating a symbol on an object. An imaging system can include an imaging device and a processor device in communication with the imaging device. The imaging device can be configured to acquire a first image of the object, including the symbol. The processor device can be configured to generate a second image that is derived from the first image, based upon determining a saturation threshold for the second image and mapping pixels of the first image to the second image, including mapping pixels of the first image that have values outside of the saturation threshold to a maximum value for the second image, such that a brightness measurement of the second image exhibits a predetermined target relationship with the saturation threshold for the second image.

Some embodiments of the invention provide a system for evaluating a symbol on an object. An imaging device can be configured to acquire a first image of the object, including the symbol, with a first bit depth. A processor device can be configured to generate a second image that is derived from the first image based upon: determining a saturation threshold for the second image based upon a predetermined target relationship between the saturation threshold for the second image and a brightness measurement of at least one of the first image or the second image; and mapping pixels of the first image to the second image based upon the saturation threshold for the second image.

Some embodiments of the invention provide a method for evaluating a symbol on an object, which can be at least partly implemented using an imaging device and a processor device. A first image of the object, including the symbol, can be acquired with the imaging device. With the processor device, a second image can be generated that is derived from the first image, including by: determining a saturation threshold for the second image that can be different from a saturation threshold for the first image; and mapping pixels of the first image to the second image, including mapping pixels of the first image that have values outside of the saturation threshold for the second image to a maximum value for the second image. The saturation threshold for the second image can be determined based upon a target relationship between the saturation threshold for the second image and a brightness measurement of at least one of the first image or the second image. The second image can be evaluated, with the processor device, to determine at least one attribute of the symbol.

Some embodiments of the invention provide a system for evaluating a symbol on an object. An imaging system can include an imaging device, and a processor device in communication with the imaging device. The imaging device can be configured to acquire a first image of the object, including the symbol, with a first bit depth. The processor device can be configured to: generate a second image from the first image, including by mapping of pixels of the first image to pixels of the second image, the second image having a second bit depth that is equal to or smaller than the first bit depth; and evaluate the second image to determine at least one quality attribute of the symbol.

Some embodiments of the invention provide a system for evaluating a symbol on an object. The system can include an imaging device and a processor device in communication with the imaging device. The imaging device can be configured to acquire a first image of the object, including the symbol, with a first bit depth. The processor device can be configured to determine, for the first image, at least one of a saturation threshold and a light-pixel mean, and to determine, based at least partly upon the at least one of the saturation threshold and the light-pixel mean, a mapping of pixels of the first image to a second image that has second bit depth that is smaller than or equal to the first bit depth. The processor device can also be configured to generate, from the first image, the second image with the second bit depth, and to evaluate the second image to determine at least one quality attribute of the symbol.

Some embodiments of the invention provide a method for evaluating a symbol on an object, which can be at least partly implemented using an imaging device and a processor device. A first image of the object, including the symbol, can be acquired with the imaging device, with a first bit depth. A second image generated from the first image, with the processor device, including by mapping pixels of the first image to pixels of the second image, with the second image having a second bit depth that is smaller than or equal to the first bit depth. The second image can be evaluated, with the processor device, to determine at least one attribute of the symbol.

To the accomplishment of the foregoing and related ends, embodiments of the invention can include one or more of the features hereinafter fully described. The foregoing and following description and the annexed drawings set forth in detail certain example aspects of the invention. However, these aspects are indicative of but a few of the various ways in which the principles of the invention can be employed. Other aspects, advantages and novel features of the invention will become apparent from the detailed description herein as considered along with the drawings.

BRIEF DESCRIPTION OF THE DRAWINGS

The features and advantages of the invention are apparent from the following description taken in conjunction with the accompanying drawings in which.

DETAILED DESCRIPTION OF THE INVENTION

Figure 1:
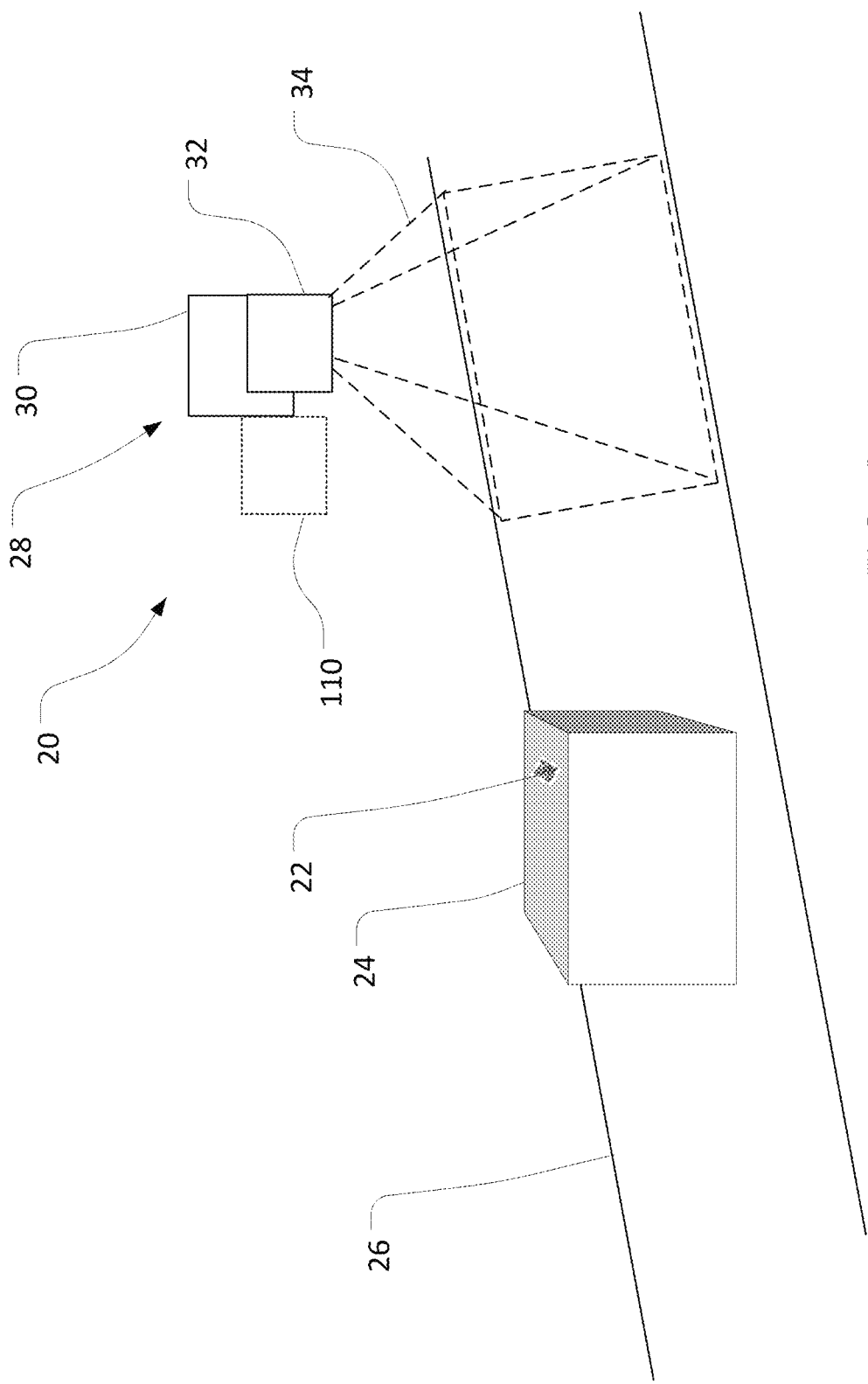
FIG. 1 is a schematic view of a machine vision system for DPM verification, according to an embodiment of the invention.

In the following detailed description, reference is made to the accompanying drawings that form a part hereof. In the drawings, similar symbols typically identify similar components, unless context dictates otherwise. The example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGS., can be arranged, substituted, combined, separated, and designed in a wide variety of different configurations, all of which are explicitly contemplated herein.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Also as used herein, unless otherwise specified or limited, the terms "component," "system," "module," and the like are intended to refer to a computer-related system that includes hardware, software, a combination of hardware and software, or software in execution. For example, a component may be, but is not limited to being, a processor device, a process running on a processor device, an object, an executable, a thread of execution, a program, and/or a computer. By way of illustration, both an application running on a computer and the computer can be a component. One or more components (or system, module, and so on) may reside within a process and/or thread of execution, may be localized on one computer, distributed between two or more computers or other processor devices, and/or included within another component (or system, module, and so on).

Also as used herein, unless otherwise specified or limited, the term "symbol" indicates an information carrying indicia, including indicia that can be imaged by an imaging device. In some implementations, a symbol may be formed as by printing, deposition, laser etching, and so on, including in the form of a DPM symbol, such as a DPM 2D (or other) barcode. In some implementations, symbols can be formed in other ways, such as by printing with ink.

Some embodiments of the invention can be implemented as systems and/or methods, including computer-implemented methods. Some embodiments of the invention can include (or utilize) a device such as an automation device, a special purpose or general purpose computer including various computer hardware, software, firmware, and so on, consistent with the discussion below.

In some embodiments, aspects of the invention, including computerized implementations of methods according to the invention, can be implemented as a system, method, apparatus, or article of manufacture using standard programming and/or engineering techniques to produce software, firmware, hardware, or any combination thereof to control a computer or other processor device to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media.

Certain operations of methods according to the invention, or of systems executing those methods, are represented schematically in the FIGS. Unless otherwise specified or limited, representation in the FIGS. of particular operations in particular spatial order is not intended to require those operations to be executed in a particular order. Certain operations represented in the FIGS., or otherwise disclosed herein, can be executed in different orders, as appropriate for particular embodiments of the invention. Further, in some embodiments, certain operations can be executed in parallel, including by dedicated parallel processing devices, or separate computing devices configured to interoperate as part of a large system.

As also discussed above, it may be useful to evaluate symbols, including 2D barcodes and others, using imaging systems. For example, in DPM contexts, it may be useful to use acquired images of a DPM barcode (e.g., a 2D barcode) to verify the quality of the barcode. In this way, for example, users can ensure that DPM (or other) symbols exhibit appropriately high print quality and overall fidelity.

Likewise, in some cases, it may be useful to evaluate symbols on objects that are moving or are stationary only for a short time. For example, it may be useful to conduct verification of DPM symbols as marked objects are moving along a production line. This may significantly complicate evaluation operations.

It may also be useful to evaluate symbols in contexts in which lighting conditions may be variable or otherwise non-ideal, or for objects that may produce relatively specular reflection. This may also significantly complicate evaluation operations.

Some conventional approaches aim to improve symbol evaluation by executing an iterative process that includes the acquisition and evaluation of multiple images, including through the use of machine vision systems. For example, a machine vision system can be configured to evaluate symbols based on aspects of Technical Report 29158, issued by the International Organization for Standardization ("ISO")

and the International Electrotechnical Commission ("IEC")—also referred to as the "AIM DPM" guidelines.

The AIM DPM guideline describes the evaluation of the quality of DPM symbols, based on acquisition of multiple images and analysis thereof. In particular, AIM DPM requires a particular system response (e.g., gain, f-stop, or shutter-time settings) for evaluation of barcodes in images and provides for adjustment of the system response of an imaging device if evaluation of an initial image indicates incorrect exposure. For example, under AIM DPM, if an initial image is excessively saturated or exhibits insufficient resolution, appropriate adjustments should be made to the system response and a subsequent image captured. The subsequent image can then be evaluated to determine whether the adjusted system response has achieved the correct system response (i.e., such that the ratio of mean bright-pixel brightness to saturation matches a desired value). In this way, through a process of multiple successive image acquisitions, an operational system response can be obtained that appropriately balances saturation and resolution and, in particular, that maintains a certain relationship between overall image brightness and the brightness level at which saturation occurs. The operational system response can then be used for run-time image capture and evaluation of symbols. In this way, for example, evaluation of symbols can be uniformly applied for a given application or context.

Evaluation of symbols under the principles of AIM DPM can be useful, but acquisition of multiple images for evaluation may be impractical or undesirable in some contexts. For example, on active production lines it may not be feasible to acquire and process multiple images of a particular object with a DPM symbol without stopping operation of the line. Accordingly, it may be useful to provide a system that can support accurate evaluation of DPM (or other) symbols without necessarily requiring capture of multiple images.

Embodiments of the invention can address the issues noted above, or otherwise provide improved systems or methods for evaluation of symbols. For example, in some embodiments, in order to evaluate a symbol, a first image of the symbol can be acquired using an imaging device. A second image can then be derived from the acquired first image, without necessarily requiring any further acquisition of images of the symbol (at least for the current evaluation cycle).

In particular, in some embodiments, it may be useful to derive the second image from the first image based upon determining a saturation threshold for the second image that will preserve a target relationship between saturation threshold and image brightness. For example, a target ratio between saturation threshold and image brightness for the second image can be predetermined (e.g., based upon AIM DPM or other relevant factors), and the saturation threshold of the second image can then be determined so that mapping the pixels of the first image to the second image, including setting pixels beyond the second-image saturation threshold to a maximum, results in an image brightness for the second image that will substantially preserve the target ratio.

In some embodiments, a saturation threshold for a derived second image can be determined iteratively. For example, an initial saturation threshold can be selected for the second image based on any of a variety of considerations. Pixels of the first image can then be mapped accordingly to an "initial" second image and an image brightness of the resulting initial second image can be determined. If this initial image brightness exhibits an appropriate relationship with the initial saturation threshold, evaluation of the symbol in the initial second image can then proceed. In contrast, if an appropriate relationship between the initial image brightness and the initial saturation threshold is not achieved, a subsequent saturation threshold can be selected for the second image, and pixels of the first image can be re-mapped accordingly to a "subsequent" second image. An image brightness of the subsequent second image can then be determined, as well as a relationship between this subsequent image brightness and the subsequent saturation threshold.

As with the initial derived image, if the subsequent image brightness exhibits an appropriate relationship with the subsequent saturation threshold, evaluation of the symbol in the subsequent second image can then proceed. If an appropriate relationship is still not obtained, however, further selection of saturation thresholds, mapping of first-image pixels, and evaluation of image brightness can continue. In this regard, for example, a subsequent second image can effectively become a new initial second image, which can be succeeded by a new subsequent second image with a new subsequent saturation threshold.

In some embodiments, a saturation threshold for a derived second image can be determined without iteration, such as the example iteration described above. For example, an image brightness of a first acquired (or other) image can be determined and then a saturation threshold selected that exhibits an appropriate relationship with the determined image brightness. The selected saturation threshold can then be set as a saturation threshold for the second image and the pixels of the first image can be remapped accordingly to the second image. Notably, in some implementations, such iteration can be implemented using only a single acquired image, i.e., without requiring capture of subsequent images, such as may not be possible for moving parts.

In some embodiments, the availability of higher bit depth imaging systems in particular can make it possible to achieve a target relationship between image brightness and saturation level (e.g., such as specified in AIM DPM), based on acquisition of only a single image. For example, evaluating a symbol on an object can include acquiring a first image of the object, including the symbol, that exhibits a first bit depth (e.g., 12 or 16 bits). The first image can be analyzed to determine a mapping of the pixels of the first image to a second bit depth that is smaller than the first bit depth (e.g., 8 bits). A second image with the second bit depth can then be generated, based on the first image and the determined mapping, and can be evaluated to determine at least one quality attribute of the symbol. Accordingly, in these and other embodiments, it may be possible to evaluate symbols without acquisition of multiple images or without an iterative prior adjustment of system response, such as specified by AIM DPM.

In some embodiment, a first image, after being acquired with the first, larger bit depth, can be analyzed in a variety of ways to determine a mapping of pixels to the second bit depth. In some implementations, for example, one or more of the following operations can be executed. A dynamic range can be determined for the first image, and sets of light and dark pixels can be identified, such as specified, for example, in AIM DPM. An average intensity value of the light pixels can be determined, and then a saturation threshold can be determined based on the average intensity value. Pixels with intensity values that exceed the saturation threshold can be set to a particular value (e.g., a maximum brightness value), and the mapping of pixels of the first to the second bit depth can be determined based upon the determined saturation threshold or the average light-pixel intensity value. Or, in some embodiments, a saturation threshold can be determined such that an average intensity value of light pixels, after mapping of the pixels in view of the determined saturation threshold, exhibits an appropriate relationship with the determined saturation threshold.

In some implementations, in this regard, analysis of the first image can proceed similarly to the iterative analysis of AIM DPM. But, in some embodiments, in contrast to AIM DPM, analysis according to the present invention may require only the acquisition of a single image. i.e., may not necessarily require the acquisition of a second image of a symbol to be evaluated.

FIG. 1 illustrates an example system 20, for evaluating a symbol 22 on an object 24, according to one embodiment of the invention. In the illustrated embodiment, the symbol 22 is a flat DPM 2D barcode and the object 24 is a parallelepiped box. In other embodiments, other configurations are possible. For example, any variety of geometries are possible for an object to be imaged, and any variety of symbols can be imaged and evaluated, including dot-peen or other DPM symbols, and non-DPM symbols.

In the illustrated context of FIG. 1, the object 24 is disposed on a conveyer 26 that is configured to move the object 24 past the system 20 at a predictable and continuous rate. In other embodiments, objects may be moved into or past a system according to the invention in a variety of ways. In some embodiments, objects may be stationary relative an evaluation system. In some embodiments, evaluation systems may be configured to be moved relative to the objects, and symbols, that are to be evaluated.

Generally, systems according to the invention can include an imaging device and a processor device. In the embodiment illustrated in FIG. 1, the system 20 includes an imaging system 28 that includes a processor device 30 and an imaging device 32 with a field-of-view ("FOV") 34 that includes part of the conveyer 26. Accordingly, the imaging system 28 can be configured to capture one or more images of the object 24 as the object 24 is moved by the conveyer 26.

The imaging device 32 and the processor device 30 can be configured in a variety of ways, including, respectively, as an arrangement of one or more electronic imaging sensors and one or more lens assemblies, and a programmable general purpose computer device or machine-vision computer. In some embodiments, an imaging device and a processor device can be part of physically separated systems. For example, an imaging device can be configured to communicate with a remotely disposed processor device (e.g., a cloud-based computing system) in order to execute certain operations in an implementation of the invention.

In some embodiments, an imaging device can be configured to acquire an image with a first bit depth, and an associated processor device can be configured to analyze an image with a second bit depth that is smaller than the first bit depth, including to evaluate a symbol within the image. In different embodiments, different relative scales of the first and second bit depths are possible. In the embodiment illustrated in FIG. 1, for example, the imaging device 32 is configured to acquire 12-bit images of the FOV 34 and the processor device 30 is configured to analyze 8-bit images. In some implementations, a processor device may be capable of analyzing images with the same (or greater) bit depth than may be acquired by an associated imaging device, even if particular implementations include analyzing images with smaller bit depths than those acquired by the imaging device. In some embodiments, different acquisition and processing bit-depths are possible, including in arrangements in which a processor device is configured to process the full bit depth of an associated imaging device (e.g., such that a derived second image may exhibit the same bit depth as an acquired first image).

Usefully, in some embodiments, the bit depth for image acquisition and the bit depth for image analysis can be selected so that images can be readily processed over a wide range of imaging parameters (e.g., dynamic range, average brightness, and so on). For example, as also discussed below, the bit depth for image acquisition can be selected, along with an appropriate system response, so that the brightest expected images can be captured without excessive over-saturation and so that the darkest expected images can be captured with sufficient resolution to allow appropriate analysis thereof. Similarly, the bit depth for image analysis can be selected so that images with a range of brightness profiles can be usefully analyzed, including after downward scaling of the images to the relevant smaller bit depth.

In this regard, for example, the imaging device 32 can be configured to acquire a 12-bit image of the object 24, including the symbol 22. For example, as the object 24 passes into the FOV 34, the imaging device 32 can acquire the image with a predetermined system response (e.g., predetermined f-stop and shutter speed settings). The processor device 30 can then generate a second (non-acquired) image from the first (acquired) image, such as a second image with 8-bit or otherwise reduced bit depth. For example, the processor device 30 can be configured to map relevant pixels from a first acquired image to a derived second image, including as further detailed below, in order to provide a target relationship (e.g., a ratio as specified in AIM DPM) between the saturation level and image brightness of the second image.

Once generated, the second (e.g., lower bit-depth) image can then be analyzed in order to evaluate the symbol. For example, the generated second image can be analyzed in order to evaluate one or more quality attributes of a symbol therein, including those specified in AIM DPM or other relevant guides.

In general, a generated image under embodiments of the invention can include the same subject matter and similar information as the acquired image. But the generated image may exhibit somewhat lower resolution relative to the acquired image, such as may result from a reduced bit depth. With appropriate training, however, sufficient resolution can generally be maintained to allow appropriate analysis of the acquired image (via the generated image), including for evaluation of a symbol therein, subject to limits inherent to the captured bit depth, and the minimum and maximum system response needed for the relevant application.

As also noted above, in some embodiments, a processor device can be configured to determine a mapping from a first, acquired (e.g., larger bit depth) image to a second, derived (e.g., smaller bit depth) image based upon analysis of the acquired image. For example, the processor device 30 can be configured to determine a mapping from an acquired image to a generated image based upon determining an appropriate saturation threshold for the derived image, setting pixels of the acquired image that exceed the saturation threshold to a maximum value, and then mapping pixels of the acquired image that are below the saturation threshold to corresponding brightness levels in the derived image. In this way, for example, the processor device 30 can help to ensure that relevant information from the acquired image is mapped to the generated image, while potentially superfluous pixels are given less emphasis.

Figure 2:
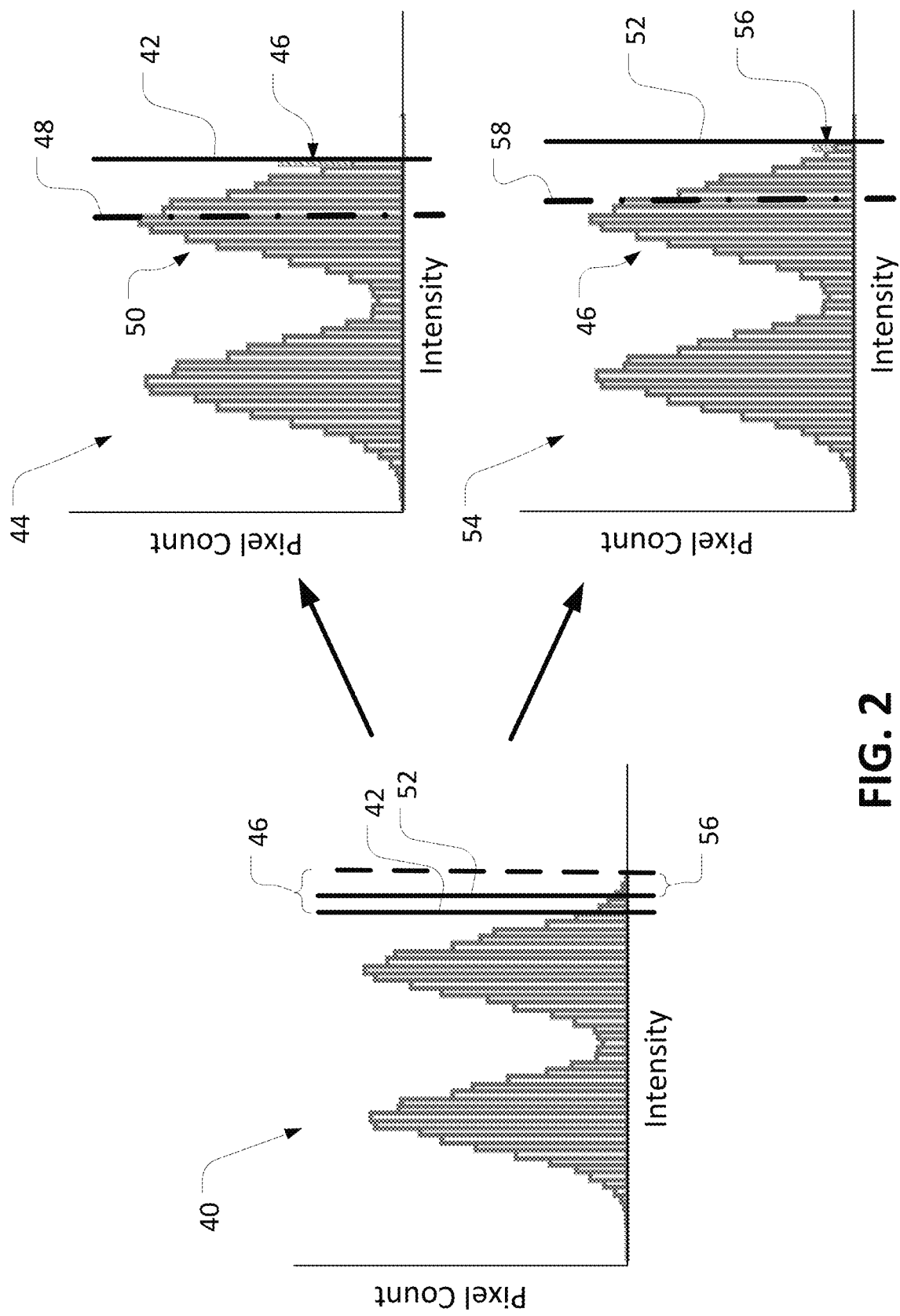
FIG. 2 is a schematic view of aspects of a method for DPM verification, according to an embodiment of the invention.

As also noted above, in some embodiments, an appropriate saturation threshold for a derived image can be determined based upon analysis of image brightness that accounts for the mapping, to a maximum value for the derived image, of pixels in an acquired image that exceed the determined saturation threshold. For example, as illustrated in FIG. 2, the imaging device 32 (see FIG. 1) has acquired a first image as represented in histogram 40. Using the processor device 30 (see FIG. 1), an initial saturation threshold 42 can be determined for a derived second image. The pixels of the first image can then be mapped to an initial derived image, as represented in histogram 44, with pixels 46 of the first image that exceed the saturation threshold 42 (as also shown in the histogram 40) having been mapped to a maximum (as shown) for the initial derived image. The image brightness of the initial derived image, such as a mean brightness 48 of light pixels 50, including the mapped pixels 46, can then be determined and compared with the saturation threshold 42 to evaluate a relationship between these factors.

If an appropriate relationship between the mean brightness 48 and the saturation threshold 42 has been achieved, such as a target ratio (e.g., approximately 77/100) as specified by AIM DPM, the initial derived image (as represented in the histogram 44) can then be used to evaluate the symbol 22. If not, then a new saturation threshold can be determined, such as a subsequent saturation threshold 52 (see, e.g., the histogram 40), in an attempt to better establish the desired relationship.

In this regard, as also discussed below, an iterative process can be employed. For example, because remapping of pixels based on a selected saturation threshold can affect the resulting mean brightness of light pixels (or other brightness measurements), a succession of operations may sometimes be iteratively executed, including: to determine successive saturation thresholds; to remap pixels and calculate the resulting respective brightness measurements; and then to evaluate whether the current saturation threshold exhibits an appropriate relationship with the associated brightness measurement of the remapped pixels, or whether another saturation threshold (and corresponding pixel mapping) should be selected.

Once the saturation threshold 52 has been determined, the pixels of the first image, including pixels 56 that exceed the saturation threshold 52, can then be re-mapped to a subsequent derived image, as represented in histogram 54, and an evaluation can be made of image brightness (e.g., determined as a mean light-pixel brightness 58) and of the relationship of the image brightness to the saturation threshold 52. Again, if an appropriate relationship between the brightness 58 and the saturation threshold 52 is achieved, the corresponding (subsequent) derived image can then be used to evaluate the symbol 22. If not, a similar iterative process can continue, with a newly selected saturation threshold (not shown), corresponding mapping of pixels, and so on.

Initial and subsequent saturation thresholds for derived images can be determined in a variety of ways. In some implementations, for example, a system may step through a predetermined set of saturation thresholds between a lower and an upper range (e.g., within a relevant dynamic range) such as by, for each saturation threshold in the predetermined set, sequentially mapping pixels, evaluating image brightness, and evaluating a relationship of the image brightness to the saturation threshold. In some implementations, such sequential evaluation may be terminated if, for example, the target relationship is established for any particular saturation threshold, or based upon other relevant criteria such as a subsequent saturation threshold resulting in worse correspondence with a target relationship than a preceding saturation threshold.

In some implementations, in contrast, a system may execute a search, such as a binary search, as may be appropriate to streamline determination of an appropriate saturation threshold and pixel mapping. For example, an initial saturation threshold may be determined, such as by identifying a saturation threshold at a mid-point of a relevant brightness range, and corresponding analysis can then be completed (e.g., as described above). As appropriate, a new saturation threshold can then be identified based upon on whether the initial analysis indicates that a higher saturation threshold or a lower saturation threshold may be needed in order to obtain the target relationship. For example, if a higher (or lower) saturation threshold is needed, a new saturation threshold can be identified that is halfway between the previous saturation threshold and the upper (or lower) end of the relevant range. In other implementations, other types of searches are also possible.

Figure 3:
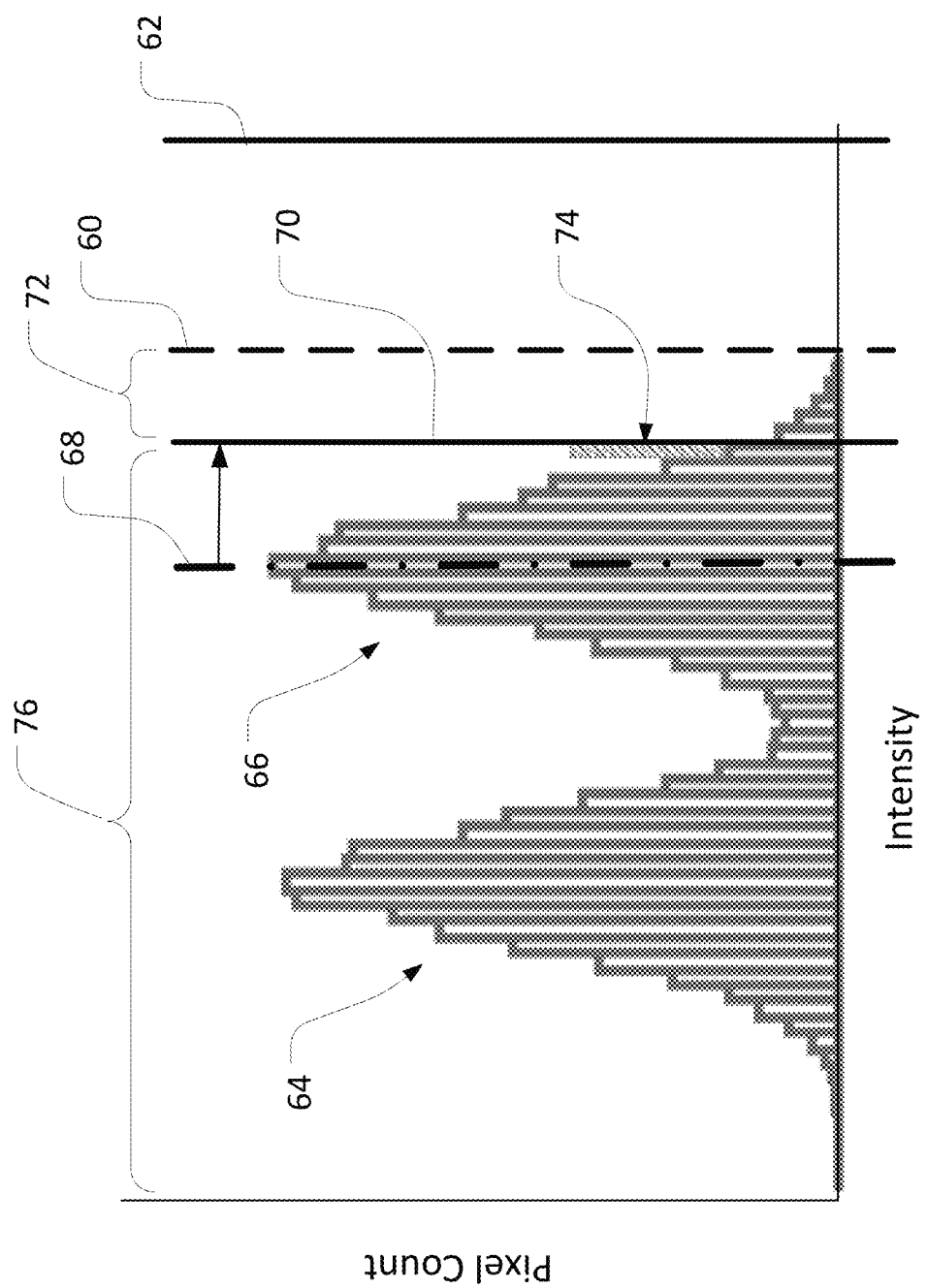
FIGS. 3 and 4 are schematic views of aspects of a method for DPM verification, according to an embodiment of the invention.

In some embodiments, an appropriate saturation threshold can be determined based upon analysis of the intensity of pixels in an acquired image, without necessarily accounting for the effects on derived-image image brightness of the mapping of those pixels to a derived image. FIG. 3 illustrates an example of this type of analysis, as executed by the system 20 (see FIG. 1). In the illustrated implementation, for example, the imaging device 32 has acquired a 12-bit image. Correspondingly, the processor device 30 has determined a dynamic range 60 of the image, and has generated a histogram of the image, as represented graphically in FIG. 3. (With this and other examples, those of skill in the art will recognize that the processor device 30 may not necessarily generate a graphical representation, but may perform certain tasks entirely numerically, such as by storing and performing calculations on lists of pixel counts.)

For the particular 12-bit image represented in FIG. 3, the dynamic range 60 is notably smaller than a maximum intensity 62 that may be possible. Accordingly, certain information in the 12-bit image may not be particularly useful or relevant to a desired image analysis (e.g., evaluation of a symbol). Embodiments of the invention can generally eliminate some of that information from a reduced bit-depth (or other derived) image for analysis, including as discussed above and below.

In some implementations, having identified the dynamic range 60 and generated the histogram counts (as shown in FIG. 3), the processor device 30 can interrogate the resulting bimodal distribution to identify a set of light pixels 66 and a set of dark pixels 64. An average light-pixel value 68 (e.g., a mean intensity) can be determined from analysis of the light pixels 66 and then a saturation threshold 70 can be determined based upon the average light-pixel value 68.

In some implementations, the saturation threshold 70 can be determined as a predetermined multiple (e.g., approximately 100/77) of the average light-pixel value 68. In this way, for example, the average light-pixel value 68 can be approximately 77 percent of the saturation threshold 70. In other implementations, other approaches are possible.

With the saturation threshold 70 having been determined, pixels 72 that exceed the threshold 70 can be set to a predetermined value. For example, in some embodiments, the pixels 72 can be set to the maximum intensity value within the saturation threshold 70, which may result in an increase in pixel count at the greatest intensity range under the threshold 70, as represented by pixels 74 in FIG. 3. Pixels 76 of the acquired image that are below the saturation threshold can then be mapped to the lower bit depth of the determined image, which can be analyzed to evaluate the symbol 22 (see FIG. 1).

As also noted above, the selection of the particular value of the saturation threshold 70 and the corresponding remapping of the pixels 72 can result in changes to average brightness (or other measurements of image brightness) relative to the initially acquired image. In some cases, accordingly, selection of an initial saturation threshold, such as the threshold 70, may result in average image brightness that does not appropriately exhibit a desired relationship (e.g., ratio) with the initial saturation threshold. In that case, for example, as also discussed above, an iterative selection of one or more subsequent saturation thresholds can then proceed, along with corresponding remapping of pixels and calculation of updated brightness measurements, until an appropriate relationship has been achieved.

In some implementations, measures of image brightness other than an average (e.g., mean) intensity of light pixels can be used. For example, in some implementations, the processor device 30 can be configured to determine a variance or other statistical measure of the light pixels and can then determine the saturation threshold 70 (or other mapping parameter) accordingly. Likewise, in some implementations for which higher dynamic range is preferred, such as for reading applications (e.g., in contrast to evaluation applications), other measures of image brightness may be beneficially used.

In some implementations, operations discussed herein can be executed in different orders than those in which they are expressly presented. For example, in some implementations, it may be possible to set the pixels 72 to a predetermined value(s) after mapping the pixels 76 to a lower bit-depth (or other derived) image.

Figure 4:
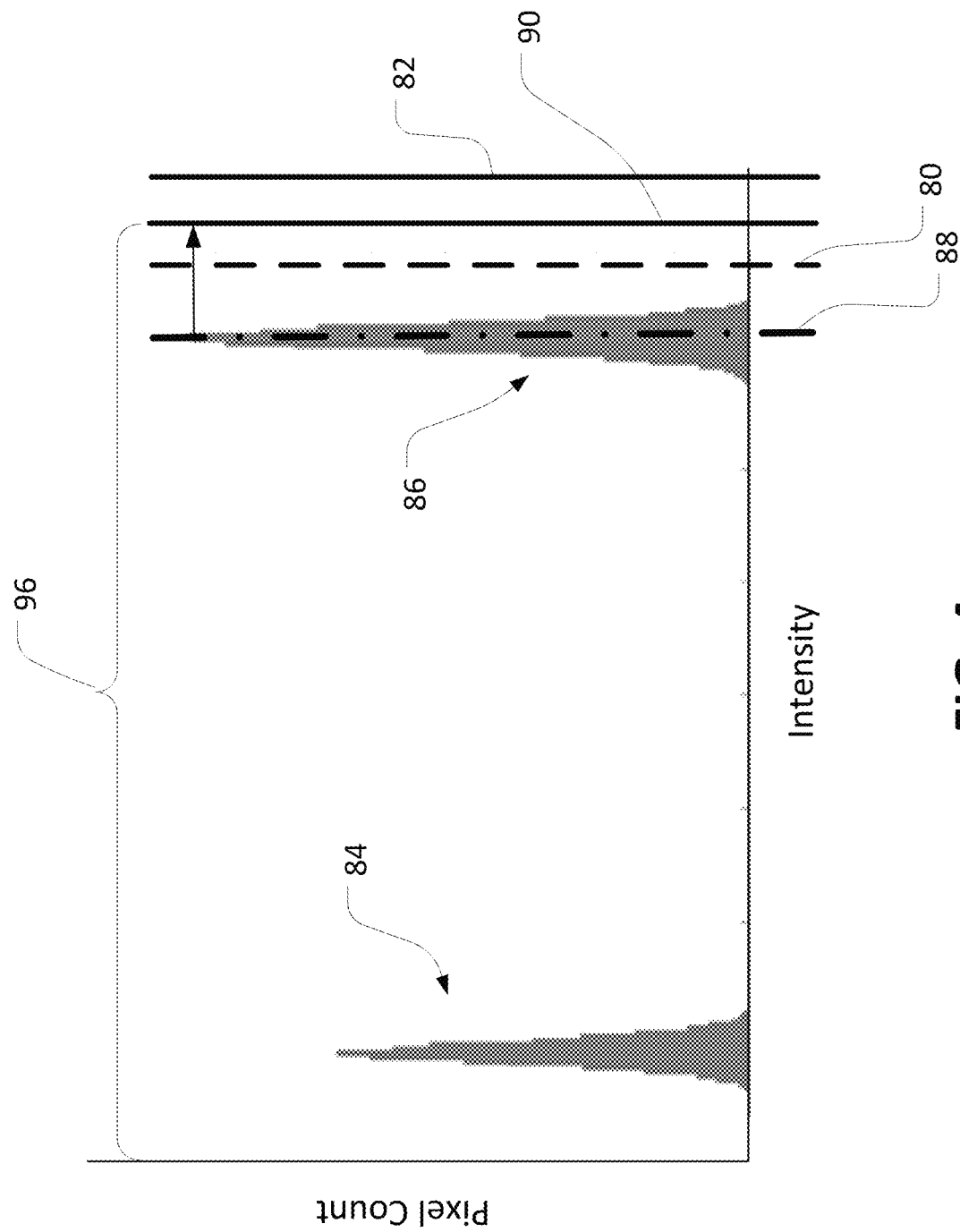

FIG. 4 illustrates another example of an analysis process that can be implemented by the system 20 of FIG. 1. In the illustrated implementation, the imaging device 32 has acquired another 12-bit image. Correspondingly, the processor device 30 has determined a corresponding dynamic range 80 of the image and has generated a histogram of the image, as represented graphically in FIG. 3. (Again, those of skill in the art will recognize that the processor device 30 may not necessarily generate a graphical representation, but may perform certain tasks entirely numerically such as by storing and performing calculations on lists of pixel counts.)

For the particular 12-bit image represented in FIG. 4, the dynamic range 80 is almost equal to a maximum intensity 82 that may be possible for the image. Accordingly, relatively little information in the 12-bit image may be irrelevant or inutile for desired image analyses (e.g., symbol evaluation). In this regard, for example, it can be seen that the acquisition of a larger bit depth image, which can accommodate the intensities in the image represented in FIG. 4, can allow for high-resolution acquisition of images with a wide variety of dynamic ranges. Further, as also discussed above, reduction of the bit depth for analysis can still allow for reliable and high quality analysis of those same images, including in keeping with aspects of AIM DPM. Also, in contrast to conventional approaches, analysis under some embodiments of the invention can proceed based on acquisition of only a single image.

In some implementations, for example, having identified the dynamic range 80 and generated the histogram counts (as shown in FIG. 4), the processor device 30 can interrogate the resulting bimodal distribution to identify a set of light pixels 86 and a set of dark pixels 84. A statistical measure of the light pixels, such as a mean light-pixel intensity 88 can be determined from analysis of the light pixels 86 and then a saturation threshold 90 can be determined based upon the mean 88.

In some implementations, the saturation threshold 90 can be determined as a predetermined multiple (e.g., approximately 100/77) of the mean light-pixel value 88. In this way, for example, the mean light-pixel value 88 can be approximately 77 percent of the saturation threshold 90. In other implementations, other approaches are possible. In other implementations, other multiples (or ratios) may be appropriate. In some implementations, such as discussed with regard to FIG. 2, a saturation threshold for a derived image can be similarly determined, but based also upon calculations of image brightness after the pixels of an acquired image have been mapped to a derived image, taking into account any brightness cut-off imposed by the determined saturation threshold.

With the saturation threshold 90 having been determined, pixels that exceed the threshold 90 can be set to a predetermined value that may be encompassed by the threshold 90. In the illustrated implementation, however, the light pixels are sufficiently clustered so that few or no pixels of the acquired image exceed the saturation threshold 90. Accordingly, for example, it may not be necessary to set the intensity values of any pixels to a new value, other than may be necessary to map pixels 96 of the acquired image to a lower bit-depth (e.g., in a scaling operation). The mapped, lower bit-depth image can then be analyzed to evaluate the symbol 22 (see FIG. 1).

In some implementations, it may be useful to train a system for evaluating a symbol before acquiring images for evaluation or at other times, including dynamically during run-time operations. This may be useful, for example, to prevent over-saturation of acquired images of the brightest targets.

Figure 5:
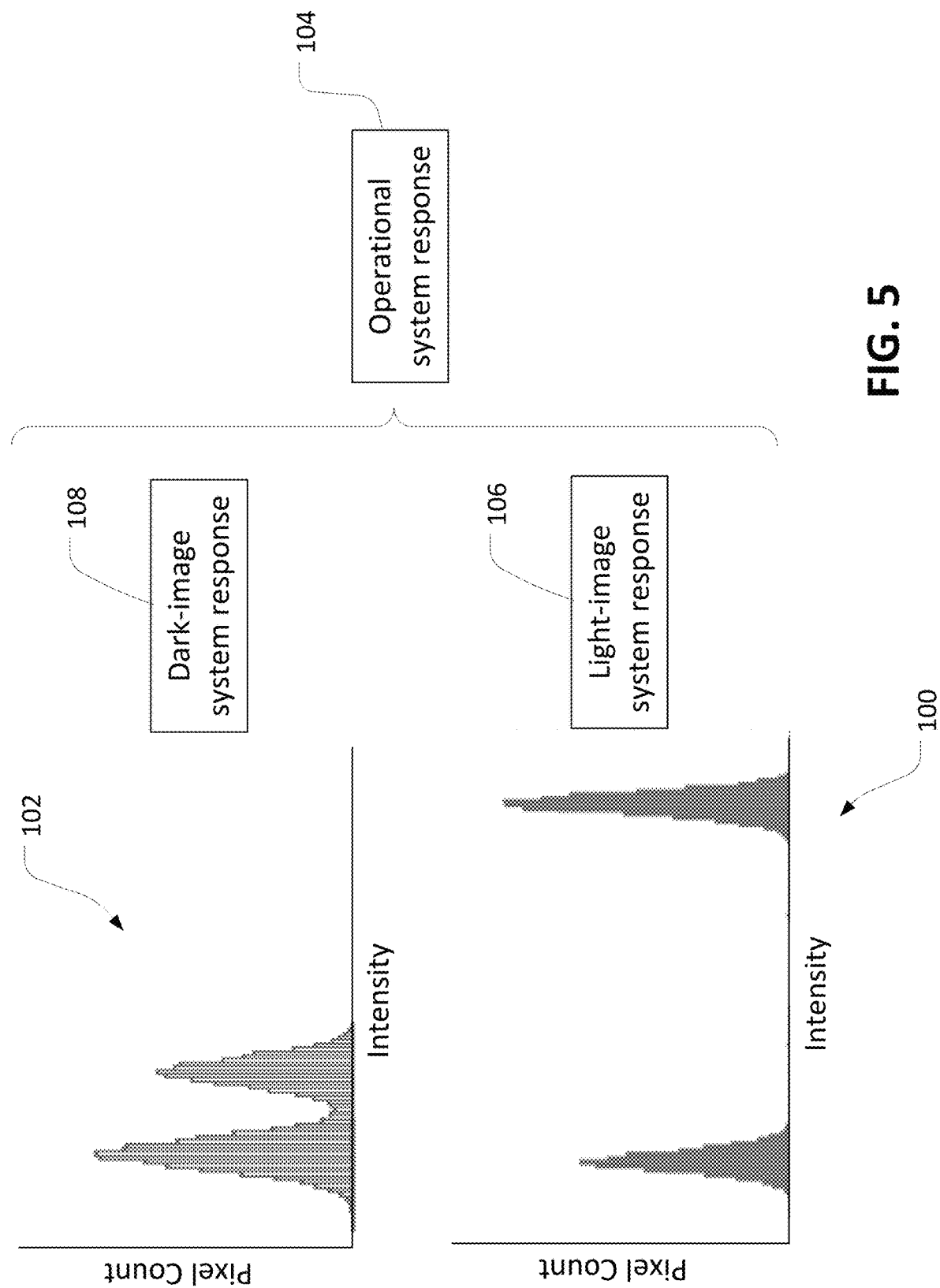
FIG. 5 is a schematic view of a training process for DPM verification, according to an embodiment of the invention.

In different implementations, different training approaches may be possible, including those that appropriately optimize a balance between resolution and dynamic range. In this regard, FIG. 5 illustrates aspects of example training operations that can be executed by the system 20 (see FIG. 1). In other implementations, other operations are possible.

In the implementation illustrated in FIG. 5, the imaging device 32 (see FIG. 1) can be configured to acquire at least two training images: a bright-image training image and a dark-image training image. In particular, the bright-image training image, as represented in histogram 100, can be configured to appropriately acquire an image that represents a maximum expected image brightness for the relevant context. For example, a training object or scene can be arranged so that the imaging device 32 will be exposed to the brightest specular reflections or overall lighting as may be reasonably expected during run-time operation of the system 20. In contrast, the dark-image training image, as represented in histogram 102 can be configured to represent a minimum expected image brightness for the relevant context. For example, a training object or scene can be arranged so that the imaging device 32 will be exposed to the dimmest specular reflections or overall lighting as may be reasonably expected during run-time operation of the system 20.

Once acquired, the bright-image or dark-image training images can be analyzed in order to determine an appropriate operational system response 104 for the imaging device 32 (i.e., the system response for the imaging device 32 during run-time operations). This may be useful, for example, to ensure optimally (e.g., substantially) full use of the possible dynamic range of the imaging device 32 for the bright-image training image, and appropriate resolution of relevant features in the dark-image training image.

If an appropriate balance between these (or other) factors is obtained, the system response that was used to acquire the training images can then be set as the operational system response. In contrast, if an appropriate balance is not obtained, the operational system response can be determined after adjustment of the system response for training, including by computational adjustment (e.g., based on look-up tables or previous training or run-time efforts), or by acquisition and analysis of one or more additional dark-image or light-image training images using updated system responses.

In some implementations, a bright-image training image can be acquired with a different system response than a dark-image training image. An operational system response determined based on comparative analysis of the training images (or system responses) or based on iterative acquisition of training images with converging system responses.

In some implementations, iterative training operations may be possible. For example, as discussed above, some implementations can include iterative acquisition of training images with different system responses, in order to identify an appropriately optimized operational system response.

In some implementations, an operational system response can be determined so as to provide an appropriate relationship between a statistical measure of the light pixels of a bright-image training image and a maximum intensity provided by a bit depth for operational image acquisition. For example, the operational system response 104 can sometimes be determined as a system response that ensures that a mean intensity value of light pixels in the bright-image training image (e.g., as represented in the histogram 100) is substantially equal to a predetermined fraction (e.g., approximately 77 percent) of a maximum brightness possible for the first training image (and the imaging system generally). In this way, for example, the operational system response 104 can be selected to ensure that the maximum expected brightness during run-time operations can be recorded with substantially full use of the first bit depth and little to no over-saturation. In this regard, operations such as those detailed above can then also ensure that darker acquired images are also appropriately analyzed (e.g., via appropriately scaled mapping of acquired images to lower bit depths).

In some implementations, an operational system response can be determined so as to provide appropriate resolution for features represented in a relevant dark-image training image (e.g., as represented by the histogram 102). For example, if a system response that optimizes use of an imaging bit depth for a bright-image training image (e.g., as represented by the histogram 100)) results in unacceptably low resolution for a dark-image training image, the operational system response 104 may be adjusted accordingly. In this regard, for example, in order to obtain appropriate resolution for the darkest expected images, an optimized operational system response may sometimes be determined so as to result in some oversaturation of the brightest expected images.

In some implementations, training can be executed prior to run-time operations. In some implementations, training can be executed as part of run-time operations. For example, in some implementations, the imaging system 28 (see FIG. 1) can record candidates for bright-image and dark-image training images during a period of run-time operations. As appropriate, the imaging system 28 can then update the operational system response for the imaging device 32. For example, the imaging system 28 can be configured to analyze multiple bright-image or dark-image training images similarly to the approach discussed above, in order to appropriately balance image saturation, image resolution, or other relevant factors.

In some embodiments, two imaging devices can be employed, with a first imaging device configured to acquire an initial image, and the initial image used to guide selection of system response for a second imaging device for acquisition of images for symbol evaluation. For example, a relatively fast first imaging device, such as an imaging device 110 in FIG. 1, can be configured to capture a test image of the object 24 before the imaging device 32 captures an image for evaluation of the symbol 22. The brightness (or other aspects) of the test image can then be analyzed in order to determine an appropriate system response for image acquisition by the imaging device 32, including as based on the operational bit depth of the imaging device 32 or other relevant consideration. For example, the brightness of the test image can be analyzed in the context of the system response and other known characteristics of the imaging device 110 as well as known characteristics of the imaging device 32 in order to determine an appropriate system response for the imaging device 32 to capture an appropriate image. In this way, for example, acquisition of a test image by the imaging device 110 can help to support using the imaging device 32 to acquire a first image that exhibits appropriate characteristics. In some implementations, such an image acquired by the imaging device 32 can then be mapped to a derived image, such as described above, based upon an appropriately determined saturation threshold.

Consistent with the discussion above, some embodiments of the invention can include computer-implemented methods, including methods executed by software or hardware modules of symbol-evaluation or other (e.g., general machine-vision) systems. In this regard, for example, methods that can include one or more of the operations discussed above or below can be implemented by modules of the system 20 (see FIG. 1), or by modules of other systems.

Figure 6:
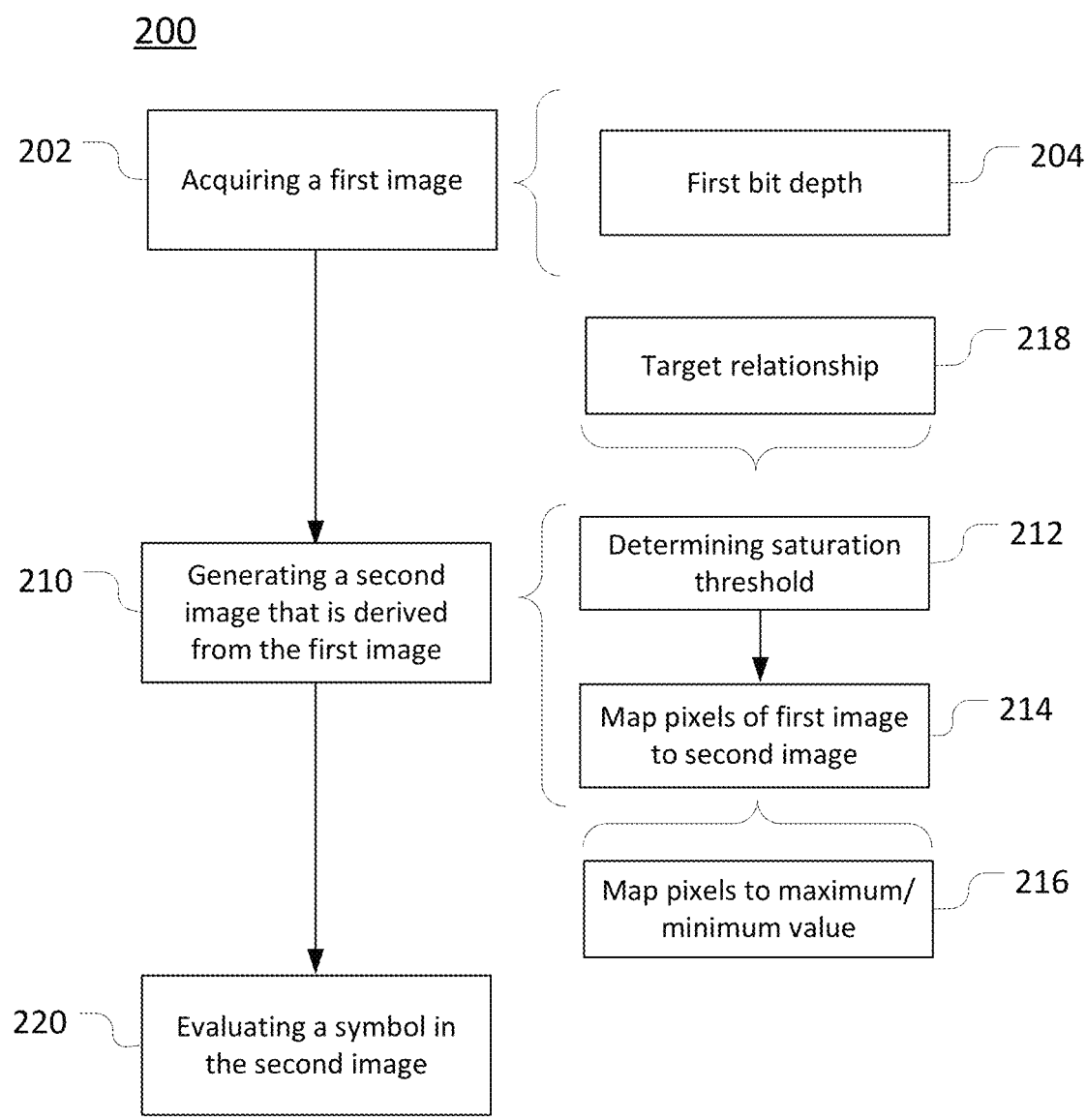
FIGS. 6 through 8 are diagrammatic views of methods of symbol evaluation, according to embodiments of the invention.

As one example, as illustrated in FIG. 6, an embodiment of the invention can include a method 200 for evaluating a symbol on an object. In some implementations, the method 200 can be at least partly implemented using an imaging device and a processor device, such as the imaging device 32 and processor device of the system 20 (see FIG. 1).

Among other operations, the method 200 includes acquiring 202, with the imaging device, a first image of the object, including the symbol. In some cases, the acquired 202 first image can exhibit a particular bit depth 204, as may sometimes support generation of a lower bit-depth derived image (as also discussed above).

After the first image has been acquired 202, the method further includes generating 210, with the processor device, a second image that is derived from the first image. In the illustrated implementation, for example, generating 210 the derived second image includes determining 212 a saturation threshold for the second image and mapping 214 pixels of the acquired image to the derived image, including mapping 216 to a maximum value, pixels of the acquired image that exceed the determined 212 saturation threshold. In some implementations, as also noted above, the generated 210 second image can exhibit a bit depth that is smaller than the bit depth 204.

In some implementations and as also discussed above, it can be useful to determine 212 a saturation threshold based upon a target relationship 218 between the saturation threshold and image brightness. For example, in some implementations, the method 200 includes determining 212 a saturation threshold such that a predetermined ratio (e.g., approximately 77/100) is achieved between a brightness of the generated 210 second image and the saturation threshold, including after mapping 214, 216 of the pixels as discussed above.

In the illustrated implementation, once an appropriate derived image has been generated 210, the method 200 further includes evaluating 220 a symbol in the second image. For example, a relevant processor device can evaluate 220 the symbol in order to verify that the symbol has been appropriately printed or marked, or for other reasons.

In some implementations, for the method 200 and others, it may be useful to determine a saturation threshold and map pixels of a particular region of interest of an image. In some cases, such a region of interest may include only a part of the relevant image. For example, for image evaluation directed mainly at evaluation 220 of a symbol, it may be useful to identify a region of interest for an image that encompasses the relevant symbol but excludes certain other parts of the image. A saturation threshold can then be determined 212, and pixels of the image mapped 214 accordingly, only (or mainly) for the region of interest rather than the entire image. In some cases, an image derived based on a determined saturation threshold and corresponding pixel mapping may include only (or mainly) pixels from a region of interest in an acquired image.

In some implementations, a derived image can be presented to a user for various additional uses. For example, a second image that has been generated 210, based on an appropriately determined 212 saturation threshold and the corresponding mapping 214 of pixels, can be more visually useful to a user than an original image, which may be substantially over-saturated or may have meaningful pixels clustered over a relatively small (and, e.g., dark) range. In this regard, a generated 210 second image can provide a useful visual display for a user, such as to allow the user to better understand the content and value of a relatively dark (or other) initial image, as well as being useful for evaluation 220 of a symbol or other purposes.

Figure 7:
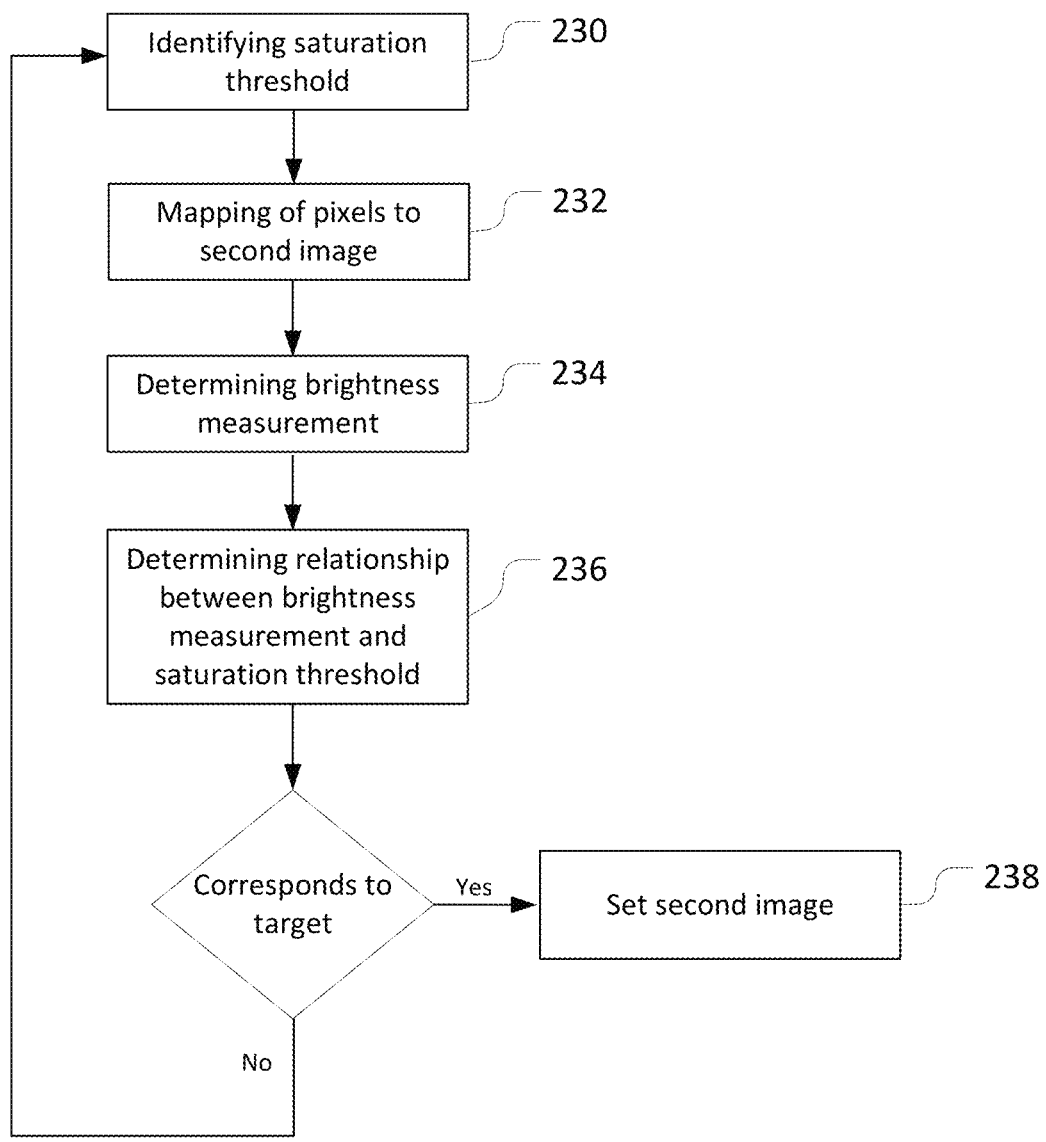

In some implementations, determining 212 a saturation threshold can include a potentially iterative process. In the implementation illustrated in FIG. 7, for example, determining 212 a saturation threshold includes first identifying 230 an initial saturation threshold. As also noted above, the initial saturation threshold can be identified 230 in a variety of ways, including based on identifying a lower or upper end of a preset range of saturation thresholds, a midpoint or other intermediary point in such a range, or otherwise.

After the initial saturation threshold has been identified 230, pixels of the acquired 202 first image can be mapped 232 to an initial (derived) second image (see also mapping 214 of FIG. 6). A brightness measurement of the initial second image can then be determined 234. For example, a mean light-pixel brightness for the initial second image can be determined 234 using one or more of a variety of known approaches, such as the approach taught in AIM DPM.

To determine whether the initial second image exhibits appropriate characteristics, a relationship between the brightness measurement and the initial saturation threshold can then be determined 236. For example, the processor device 30 can determine 236 a ratio of the determined 234 brightness measurement to the identified 230 saturation threshold.

If the determined 236 relationship substantially corresponds to a target predetermined relationship, such as a predetermined ratio (e.g., approximately 77/100), the initial second image can be set 238 as a final second image and a symbol in the derived image can be evaluated 220 (see FIG. 6) appropriately. If, in contrast, the determined 236 relationship does not substantially correspond to the predetermined relationship, the process illustrated in FIG. 7 can be repeated, with identification 230 of a subsequent saturation threshold, mapping 232 of pixels to a subsequent (derived) second image based on the subsequent saturation threshold, evaluation of a relationship between the resulting image brightness and the saturation threshold, and so on.

In this regard, for example, as also discussed above, an iterative process can be employed. For example, because remapping of pixels based on an identified 230 saturation threshold can affect the resulting mean brightness of light pixels (and other brightness measurements), a succession of operations may be executed to identify 230 successive saturation thresholds, map 232 the pixels accordingly, determine 234 the resulting respective brightness measurements, and then evaluate whether the determined 236 relationship is appropriate or whether another saturation threshold should be identified 230.

Figure 8:
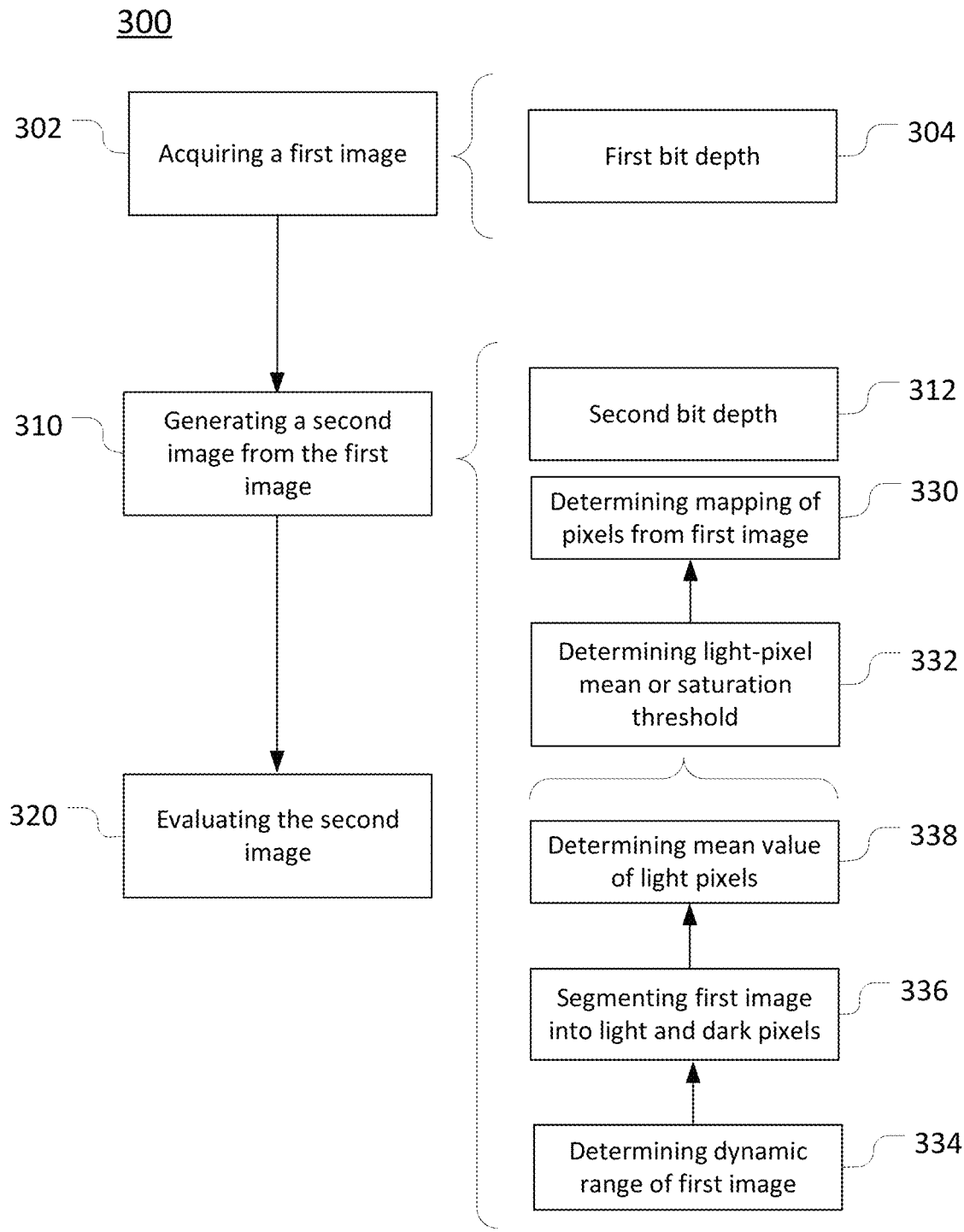

As another example, as illustrated in FIG. 8, an embodiment of the invention can include a method 300 for evaluating a symbol on an object. In some implementations, the method 300 can be at least partly implemented using an imaging device and a processor device, such as the imaging device 32 and processor device of the system 20 (see FIG. 1).

Among other operations, the method 300 includes acquiring 302, with an imaging device, a first image of an object, including a symbol. In particular, the image can be acquired 302 with a first bit depth 304 (e.g., a bit depth of 12 bits or more). In order to facilitate further analysis, the method 300 also includes generating 310, with a processor device, a second image from the first image, with the second image including a second bit depth 312 that is smaller than the first bit depth 304 (e.g., a bit depth of 8 bits or less). In some regards, this can include determining 330 a mapping of pixels of the first image to pixels of the second image, and implementing the determined 330 mapping. As appropriate, the second image can then be evaluated 320, with the processor device, including to determine at least one quality attribute of the symbol.

As noted above, in some embodiments, generating 310 the second image can be based upon determining 330 a mapping of the first image to the second bit depth. In some embodiments, the mapping can be determined 330 based upon determining 332 a light-pixel mean (or other brightness measure) or a saturation threshold for the first image. For example, as also discussed above, pixels exceeding a determined saturation threshold can be set a predetermined (e.g., maximum) value and the pixels below the saturation threshold can be mapped to a lower bit depth.

In some embodiments, determining 332 a saturation threshold can be based upon statistical analysis of the first image. For example, a processing device can be configured to determine 334 a dynamic range of the first image, segment 336 the first image into sets of light pixels and sets of dark pixels, and then determine 338 an average (e.g., mean) value of the set of light pixels. The saturation threshold can then be determined 332 based upon the determined 338 average, such as by multiplying the determined 338 average by a predetermined multiple (e.g., approximately 100/77).

Figure 9:
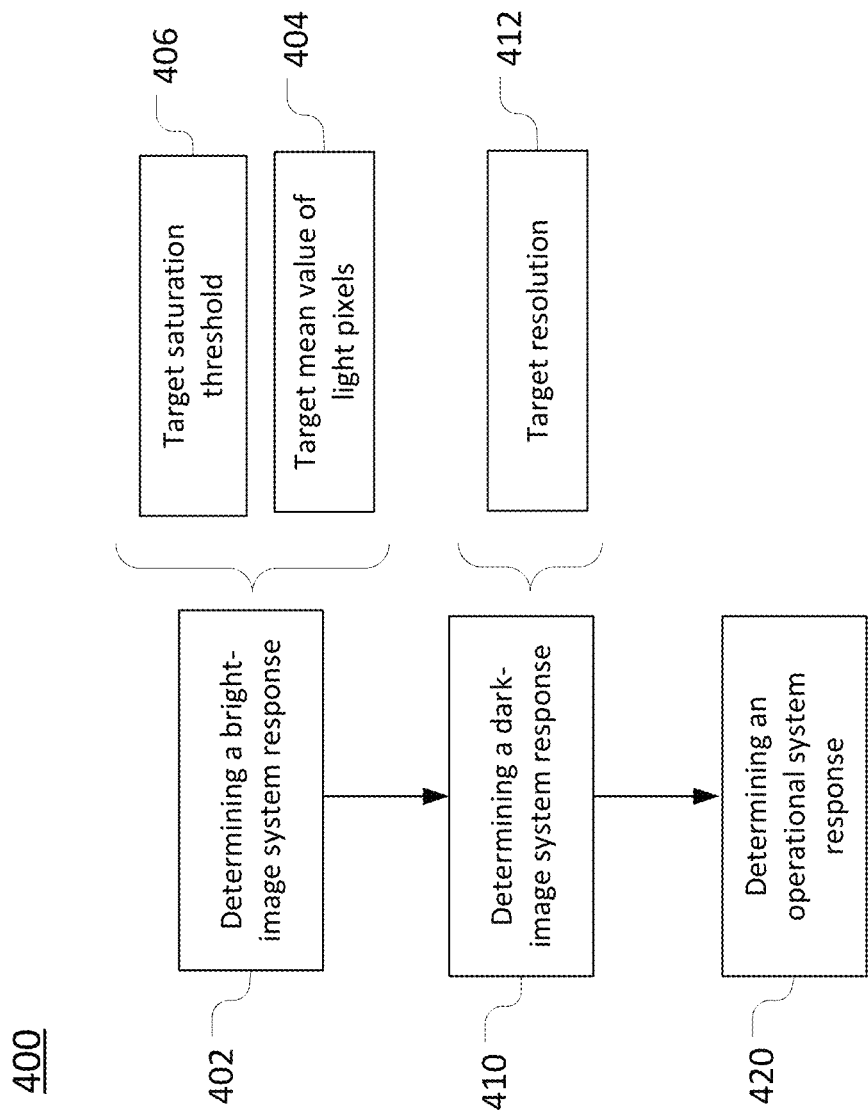
FIG. 9 is a diagrammatic view of a training method for symbol evaluation, according to an embodiment of the invention.

In some implementations, one or both of the methods 200, 300 can include, or can be implemented along with a training method, such as the method 400 illustrated in FIG. 9. In some implementations, operations of the method 400 can be executed before operations of either of the methods 200, 300. In some implementations, operations of the method 400 can be executed simultaneously with or after operations of either of the methods 200, 300. In some implementations, similarly to the methods 200, 300, the method 400 can be at least partly implemented using an imaging device and a processor device, such as the imaging device 32 and processor device of the system 20 (see FIG. 1).

In the embodiment illustrated in FIG. 9, the method 400 includes determining 402 a bright-image system response for a relevant imaging device. In particular, for example, the bright-image system response can be determined in order to appropriately configure the imaging device to capture, with the first bit depth 304 (see FIG.), a bright-image training image that represents a maximum expected brightness during run-time operations.

In some implementations, determining 402 the bright-image system response can be based upon a target statistical (e.g., mean intensity) value 404 of light pixels of a bright-image training image and a target saturation threshold 406. For example, the target saturation threshold 406 can be set to be substantially equal to a maximum intensity value for the bit depth of the bright-image training image (or the acquired 302 first image of FIG. 8). Similarly, the target statistical (e.g., mean intensity) value 404 of the light pixels can be set to exhibit an appropriate relationship to the maximum intensity value (e.g., to be approximately 77 percent thereof). The bright-image system response can then be determined 402 as a system response that can generally ensure that the actual statistical (e.g. mean intensity) value of the light pixels in the bright-image training image substantially equals the target statistical (e.g., mean intensity) value 404.

Also in the embodiment illustrated in FIG. 9, the method 400 includes determining 410 a dark-image system response for the imaging device. In particular, for example, the dark-image system response can be determined in order for the imaging device to capture, with an appropriate resolution, a dark-image training image that represents a minimum expected brightness during run-time operations. For example, a target resolution 412 for appropriate analysis of symbols during run-time can be determined, and the dark-image system response can be determined 410 in order to ensure that the target resolution 412 is generally obtained.

Continuing, the method 400 includes determining 420, based on one or more of the bright-image or dark-image system responses, an operational system response for the imaging device for acquisition of a first (larger bit-depth) run-time image (e.g., the acquired 302 image of FIG. 8). For example, the processor device 30 (see FIG. 1) can be configured to determine 420 an operational system response that corresponds to the determined 402, 410 bright-image or dark-image system responses, depending on an appropriate balancing of the target resolution 412 for darker images and the target saturation threshold 406 or statistical value 404 of light pixels for brighter images.

While the invention has been described with reference to example embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for evaluating a symbol on an object, the system comprising:
an imaging system that includes:
an imaging device; and
a processor device in communication with the imaging device;
the imaging device being configured to acquire a first image of the object, including the symbol; and
the processor device being configured to evaluate the symbol, using the first image, based upon:
selecting a saturation threshold, with a first set of pixels of the first image being within the selected saturation threshold and a second set of pixels of the first image being outside of the selected saturation threshold; and
analyzing pixels of the first image based on the selected saturation threshold, including mapping the second set of pixels of the first image to a maximum value, such that a brightness measurement of the first image that includes the first set of pixels and the mapped second set of pixels exhibits a predetermined target relationship with the selected saturation threshold.

2. The system of claim 1, wherein the brightness measurement of the mapped second set of pixels is determined based upon:
segmenting the mapped second set of pixels into light pixels and dark pixels; and
determining a mean value of light pixels.

3. The system of claim 1, wherein the first image has a first bit depth and the first set of pixels and the mapped second set of pixels together have a second bit depth that is smaller than the first bit depth.

4. The system of claim 1, wherein the maximum value is a maximum brightness value within the selected saturation threshold.

5. The system of claim 1, wherein determining the selected saturation threshold and mapping the second set of pixels of the first image includes:
identifying an initial saturation threshold;
initially mapping, to an initial maximum value, pixels of the first image that have values outside of the initial saturation threshold;
determining an initial brightness measurement based on the initial mapping, and an initial relationship between the initial brightness measurement and the initial saturation threshold; and
if the initial relationship deviates from the predetermined target relationship:
identifying a subsequent saturation threshold;
subsequently mapping, to a subsequent maximum value, pixels of the first image that have values outside of the subsequent saturation threshold; and
determining a subsequent brightness measurement based on the subsequent mapping, and a subsequent relationship between the subsequent brightness measurement and the subsequent saturation threshold.

6. The system of claim 5, wherein the subsequent saturation threshold is determined based upon one or more of the initial brightness measurement or the initial relationship between the initial brightness measurement and the initial saturation threshold.

7. The system of claim 1, wherein determining the selected saturation threshold includes:

determining a brightness measurement of the pixels of the first image; and determining the selected saturation threshold based upon the brightness measurement of the pixels of the first image and the predetermined target relationship.

8. The system of claim 1, wherein the predetermined target relationship specifies a predetermined ratio between the selected saturation threshold and the brightness measurement of the first set of pixels and the mapped second set of pixels.

9. The system of claim 1, wherein the processor device and the imaging device are further configured to execute training operations that include:
acquiring a first training image that represents a maximum expected image brightness;
acquiring a second training image that represents a minimum expected image brightness; and
determining a system response for the imaging device for acquisition of the first image based one or more of the first and second training images.

10. The system of claim 1, wherein the imaging device is a first imaging device, the system further comprising:
a second imaging device;
wherein the second imaging device is configured to acquire a test image of the object before the first imaging device acquires the first image; and
wherein the first imaging device is configured to capture the first image using a system response that is determined based upon a characteristic of the test image.

11. A system for evaluating a symbol on an object, the system comprising:
an imaging device; and
a processor device in communication with the imaging device;
the imaging device being configured to acquire a first image of the object, including the symbol, with a first bit depth; and
the processor device being configured to analyze pixels of the first image to evaluate the symbol based upon:
selecting a saturation threshold based upon a predetermined target relationship between the selected saturation threshold and a brightness measurement for the first image; and
mapping a subset of pixels of the first image to updated pixel values based upon the selected saturation threshold.

12. The system of claim 11, wherein the symbol is a DPM symbol and the object is a moving object.

13. The system of claim 11, wherein the processor device is further configured to:
determine the brightness measurement for the first image based to include the mapped subset of pixels.

14. The system of claim 13, wherein the predetermined target relationship specifies a predetermined ratio between the selected saturation threshold and the brightness measurement for the first image.

15. The system of claim 11, wherein the processor device and the imaging device are further configured to execute training operations, prior to acquiring the first image, the training operations including:
determining a bright-image system response for the imaging device to capture, with a target bit depth, a first training image that represents a maximum expected brightness;

determining a dark-image system response for the imaging device to capture, with a target resolution, a second training image that represents a minimum expected brightness; and determining, based on one or more of the bright-image or the dark-image system responses, an operational system response for the imaging device for acquisition of the first image.

16. A method for evaluating a symbol on an object, the method being at least partly implemented using an imaging device and a processor device, the method comprising:
acquiring, with the imaging device, a first image of the object, including the symbol;
adjusting the first image, with the processor device, by:
selecting a saturation threshold based upon a target relationship between the selected saturation threshold and a brightness measurement of pixels of the first image before or after the first image is adjusted; and
mapping first pixels of the first image that have values outside of the selected saturation threshold to a reduced value associated with the selected saturation threshold; and
evaluating the adjusted first image, with the processor device, to determine at least one attribute of the symbol.

17. The method of claim 16, wherein the selected saturation threshold is determined based upon identifying a plurality of potential saturation thresholds, and determining the selected saturation threshold from the potential saturation thresholds based on evaluation of an image brightness provided, respectively, by adjustment of the first image based on each of the potential saturation thresholds.

18. The method of claim 16, wherein the selected saturation threshold is determined iteratively, including by:
identifying an initial saturation threshold;
initially mapping, to an initial reduced value, pixels of the first image have values outside of the initial saturation threshold;
determining an initial brightness measurement based on the initial mapping, and an initial relationship between the initial brightness measurement and the initial saturation threshold; and
if the initial relationship corresponds to the target relationship, evaluating the first image with the initial saturation threshold as the selected saturation threshold and the initial mapping of the pixels as the mapping of the first pixels; and
if the initial relationship does not correspond to the target relationship:
identifying a subsequent saturation threshold;
subsequently mapping, to a subsequent reduced value, pixels of the first image that have values outside of the subsequent saturation threshold;
determining a subsequent brightness measurement based on the subsequent mapping, and a subsequent relationship between the subsequent brightness measurement and the subsequent saturation threshold; and
if the subsequent relationship corresponds to the target relationship, evaluating the first image with the subsequent saturation threshold as the selected saturation threshold and the subsequent mapping of the pixels as the mapping of the first pixels.

19. The method of claim 16, further comprising:
executing training operations for image acquisition and analysis, the training operations including:

one or more of:
   determining a bright-image system response for the imaging device to capture a first training image that represents a maximum expected brightness; or
   determining a dark-image system response for the imaging device to capture, with a target resolution, a second training image that represents a minimum expected brightness; and
   determining, based on one or more of the bright-image or dark-image system responses, an operational system response for the imaging device for acquisition of the first image.

20. The method of claim 19, wherein determining the bright-image system response is based upon one or more of: a target mean value of light pixels in the first training image that is a predetermined fraction of a maximum recorded brightness of the first training image; or a target saturation threshold for the maximum recorded brightness that corresponds to a first bit depth.

\* \* \* \* \*